United States Patent [19]
Scott

[11] Patent Number: 5,331,435
[45] Date of Patent: Jul. 19, 1994

[54] DIGITIZER FOR RASTER DIGITIZING AN IMAGE

[75] Inventor: John S. Scott, Melbourne, Fla.

[73] Assignee: Lenzar Electro-Optics, Inc., Riviera Beach, Fla.

[21] Appl. No.: 771,223

[22] Filed: Oct. 4, 1991

[51] Int. Cl.$^5$ ............................................. H04N 1/10
[52] U.S. Cl. .................................. 358/479; 348/142; 348/218; 348/373
[58] Field of Search ............... 358/496, 486, 488, 479, 358/406, 497, 474, 93, 229

[56] References Cited

U.S. PATENT DOCUMENTS

| | | | |
|---|---|---|---|
| 4,679,155 | 7/1987 | Mitsuka | 358/406 |
| 4,751,376 | 6/1988 | Sugiura et al. | 358/406 |
| 4,958,241 | 9/1990 | Ohtomo et al. | 358/496 |

Primary Examiner—Edward L. Coles, Sr.
Assistant Examiner—Scott A. Rogers

[57] ABSTRACT

A digitizer is provided with a camera, a movable stage and a control device. The stage may be moved by first and second linear motors such that the digitizer can be used in non-stationary or vibrating environments. A bundle of fiber optics is used to constantly illuminate a patch of an image to be digitized. Also, a control device is provided between the camera and the first and second linear motors for controlling the camera and the positioning of the stage. Various sized images can easily be digitized while memory requirements are kept low and speed is kept high. This digitizer provides for an adaptive dynamic range as well as an improved contrast sensitivity. Also, a mechanism for correcting the effects of skew and keystoning is provided which enables collection of seamless mosaics.

30 Claims, 5 Drawing Sheets

DIGITIZER FOR RASTER DIGITIZING AN IMAGE

BACKGROUND OF THE INVENTION

1. Field of the Invention

The present invention relates to a digitizer for raster digitizing an image. An image here is a generic reference to an image, map, drawing, microfiche, microfilm or any other paper or film product. The digitizer can also capture either black and white or color media. The image will be mounted on a stage which is movable by linear motors and can be "patch" illuminated by using fiber optic bundles. The digitizer can capture data over a wide range of resolutions and includes an adaptive dynamic range feature.

2. Description of the Background Art

Various digitizers are known in the art. However, these digitizers are not suitable for use in nonstationary environments such as on a ship, land vehicle, aircraft or spacecraft. Therefore, use of these digitizers is limited.

Moreover, many conventional digitizers are rather large and are very sensitive. Therefore, these digitizers are susceptible to vibration and they create scan artifacts when digitizing an image.

Additionally, many conventional digitizers are not satisfactory when scanning a large image. Either the digitizers are not equipped to move the digitizing camera or stage holding the image over a large area or the digitizers will store an unnecessary amount of data concerning the entire image. Feature scanning cannot be accomplished by some conventional digitizers. Memory requirements for these conventional digitizers therefore increase and the speed at which an image can be digitized decreases.

Conventional digitizers also use gear or screw arrangements for moving the camera or stage upon which the image is mounted. Therefore, there is an initial friction between the gears which must be overcome before positioning of the stage can be carried out. This initial friction slows down the scanning process and reduces accuracy in the positioning of the image. Additionally, lead screws are difficult to extend to large sizes for accommodating larger media types. Longer lead screws tend to bend easily resulting in problems in both accuracy and reliability.

Conventional digitizers that utilize a two-dimensional array do not provide the capabilities to achieve truly seamless mosaics—namely, deskewing and keystoning adjustments. It is not possible mechanically to achieve perfect alignment between the axis of travel and the sensor axis. This misalignment must be computed and accounted for by deskewing the acquired image. Furthermore, mechanical limitations prevent light rays passing through the focal plane of the camera from being perfectly orthogonal to the film platen—resulting in trapezoidal-shaped pixels (referred to as keystoning in the art). When trapezoidal images are mosaiced in contiguous patches, the resultant image contains gaps and overlaps. Conventional digitizers do not account for keystoning, thereby limiting their ability to achieve truly seamless mosaics.

When digitizing an image, conventional digitizers are not concerned with providing uniform illumination to the image. Therefore, deviations in scanning the image can occur and the sensitivity of the camera is decreased. Additionally, variations in the amount of lighting cannot be accommodated nor can differences between each pixel of the digitizer be easily accommodated. Also, many conventional digitizers are unacceptable for digitizing X-rays and other images having dark regions. A better gray scale resolution in the digitizing art is therefore needed.

Accordingly, a need in the art exists for additional forms of digitizers which are suitable for use in nonstationary environments and which overcome the above-noted drawbacks of conventional digitizers.

SUMMARY OF THE INVENTION

Accordingly, it is a primary object of the present invention to provide a digitizer which will operate in nonstationary environments such as on board a ship, land vehicle, aircraft or spacecraft.

It is another object of the present invention to provide a digitizer which will quickly and accurately digitize a large image while minimizing storage requirements and reducing time necessary for digitizing.

It is a further object of the present invention to provide a digitizer which uses linear motors thereby avoiding internal friction between gears and screws. Speed, accuracy, and reliability can therefore be improved. Additionally, larger format sizes can be achieved with the use of linear motors.

It is yet another object of the present invention to provide a digitizer with a real-time closed loop control mechanism to provide improved stage positioning accuracy and repeatability. The closed loop control senses and accounts for high frequency vibration that could contribute to positioning inaccuracies.

It is still a further object of the present invention to provide a digitizer having uniform patch illumination for an image.

It is yet another object of the present invention to provide a digitizer having adaptive dynamic range for satisfactorily digitizing X-rays and having a high gray scale resolution.

Yet another object of the present invention is to provide a digitizer which can satisfactorily be used with both high quality and low quality films.

A further object of the present invention is to provide for a rugged digitizer which will avoid scanning artifacts.

Yet another feature of the present invention is to provide for a digitizer which is flexible in use whereby the area for digitizing and the resolution can be easily selected.

Still a further object of the present invention is to provide a digitizer which can be easily controlled to follow irregular features and thereby reduce scan times and data storage requirements.

It is still a further object of the present invention to provide a digitizer which is compact and easy to operate.

Yet another feature of the present invention is to create a seamless mosaic between successive digitized patches by deskewing contiguous image patches and correcting for keystoning at the moment of data capture.

Still a further object of the present invention is to create perfect color registration within a given image patch by collecting all colors with no stage or camera movement.

A further object of the present invention is to provide for the capture of useable image data in films with high optical densities.

These and other objects of the present invention are fulfilled by providing a digitizer which comprises a camera having a camera housing, a movable stage and first and second linear motors for moving the stage. Means for digitizing the image viewed by the camera is provided as well as patch illumination means whereby constant illumination may be provided to the image. This patch illumination means utilizes a bundle of optical fibers. Control means are also provided in the instant digitizer which are connected to the camera and the first and second linear motors. This control means will control positioning of the stage relative to the camera as well as operation of the camera.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
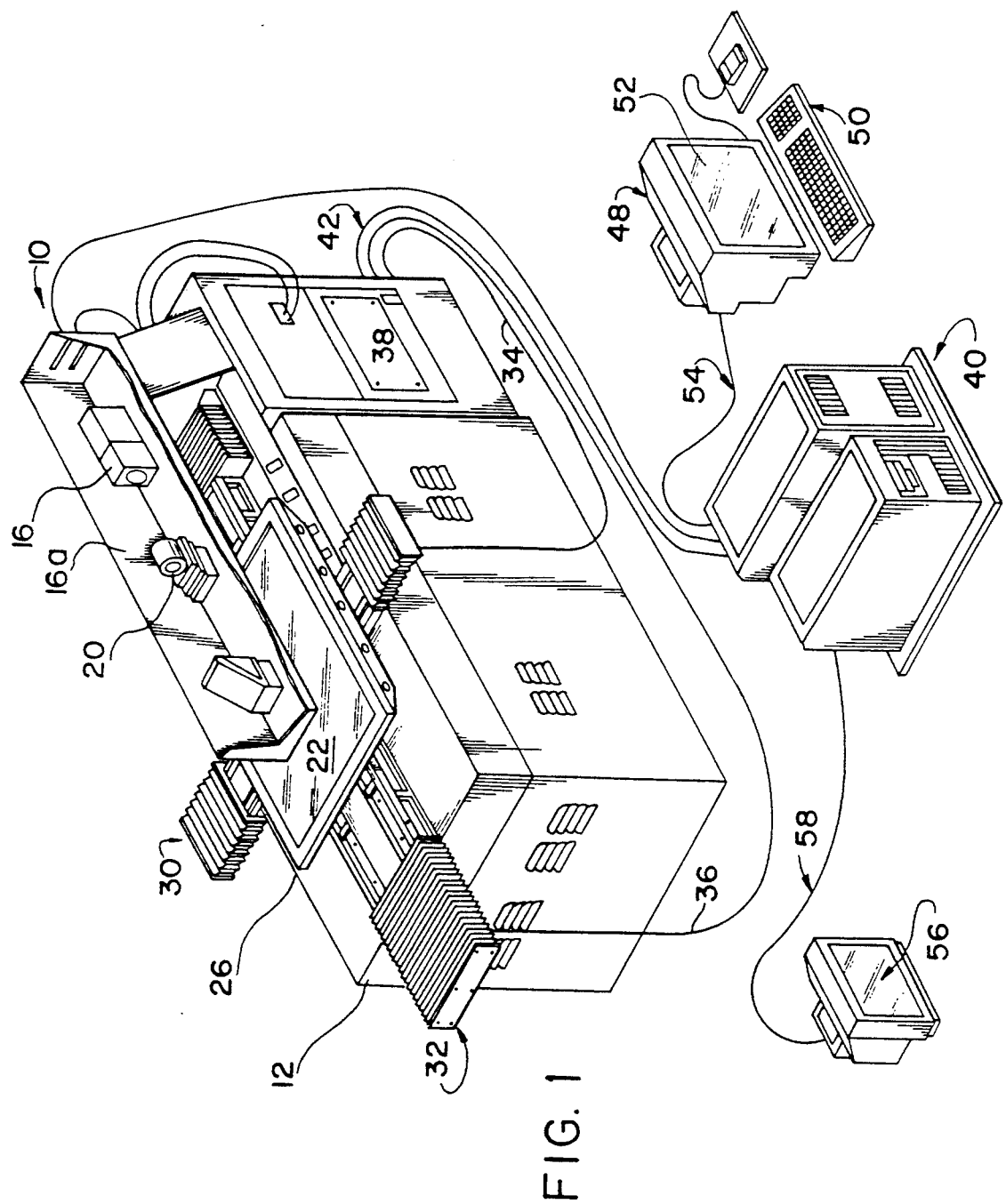
FIG. 1 is a view of the digitizer of the present invention with the cover for the digitizer removed.
Figure 2:
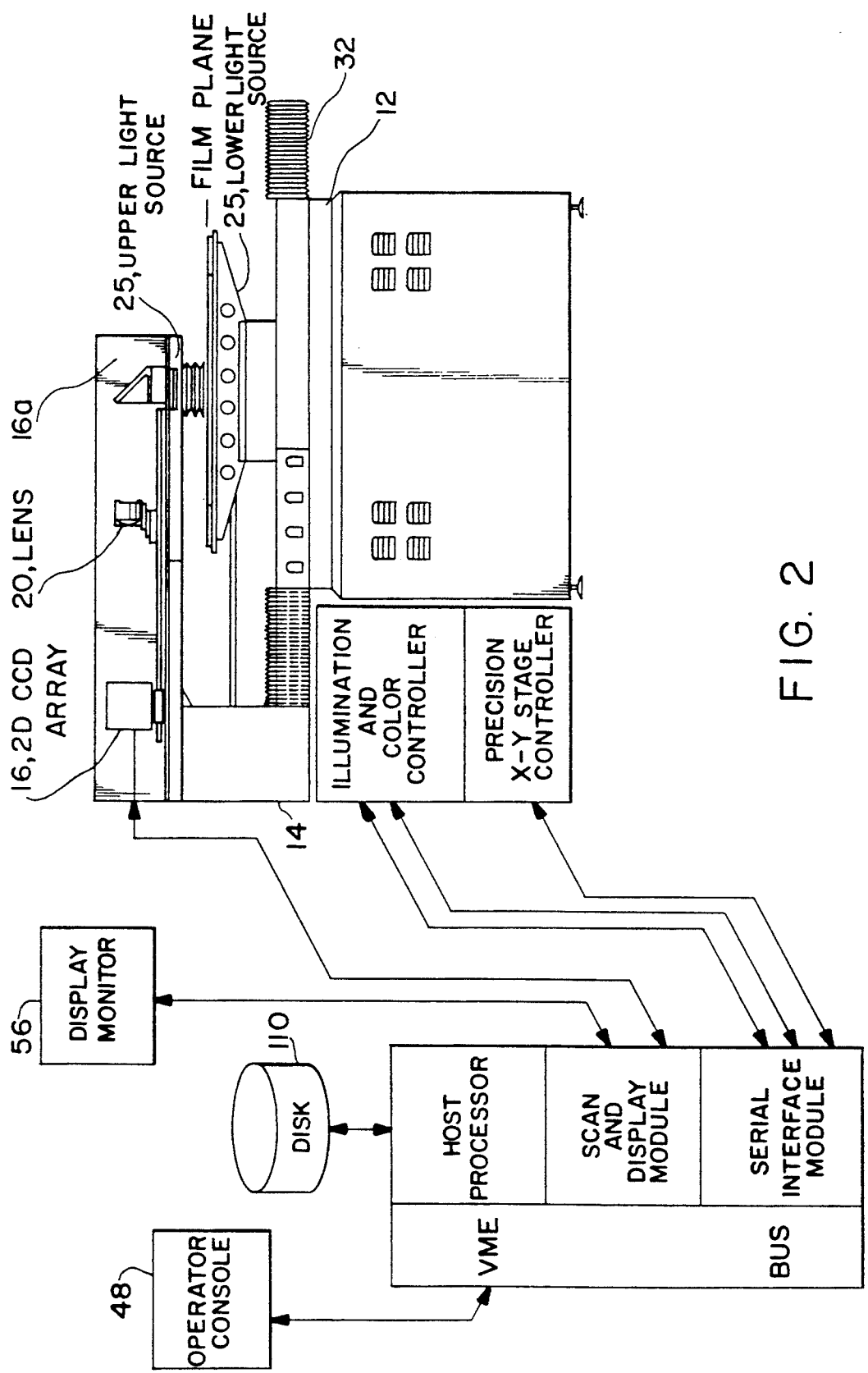
FIG. 2 is a side view of a portion of the digitizer of the present invention with closed covers over the digitizer.

Referring in detail to the drawings and with particular reference to FIG. 1, a stare-step digitizer 10 of the present invention is shown. This digitizer 10 includes a base 12 such as a granite box. Extending from this base 12 is a support 14 holding a charged coupled device (CCD) camera 16 and lens 20 housed within camera housing 16a.

Below the camera housing 16a is a hold downplate 22. The hold down plate 22 affixes the image to be digitized to the stage 26. A bundle of optical fibers is used as the light source 25 to illuminate the image as will be discussed in more detail below.

Beneath stage 26 is an X-axis linear motor 30 and a Y-axis linear motor 32. Control lines 34 and 36 extend from motors 30 and 32, respectively, to a stage controller 38. This stage controller 38 is connected to control means 40 via line 42. As will be discussed in more detail below, digitized data is sent from the digitizing means within the camera housing 16a to the control means 40.

Returning to FIG. 1, an operator interface 48 is also provided. This operator interface 48 has an input panel 50 and display 52. A connection 54 between the operator interface 48 and control means 40 is provided. A display means 56 is also provided. This display means 56 acts as a video monitor and is connected to the control means 40 by line 58.

Figure 3:
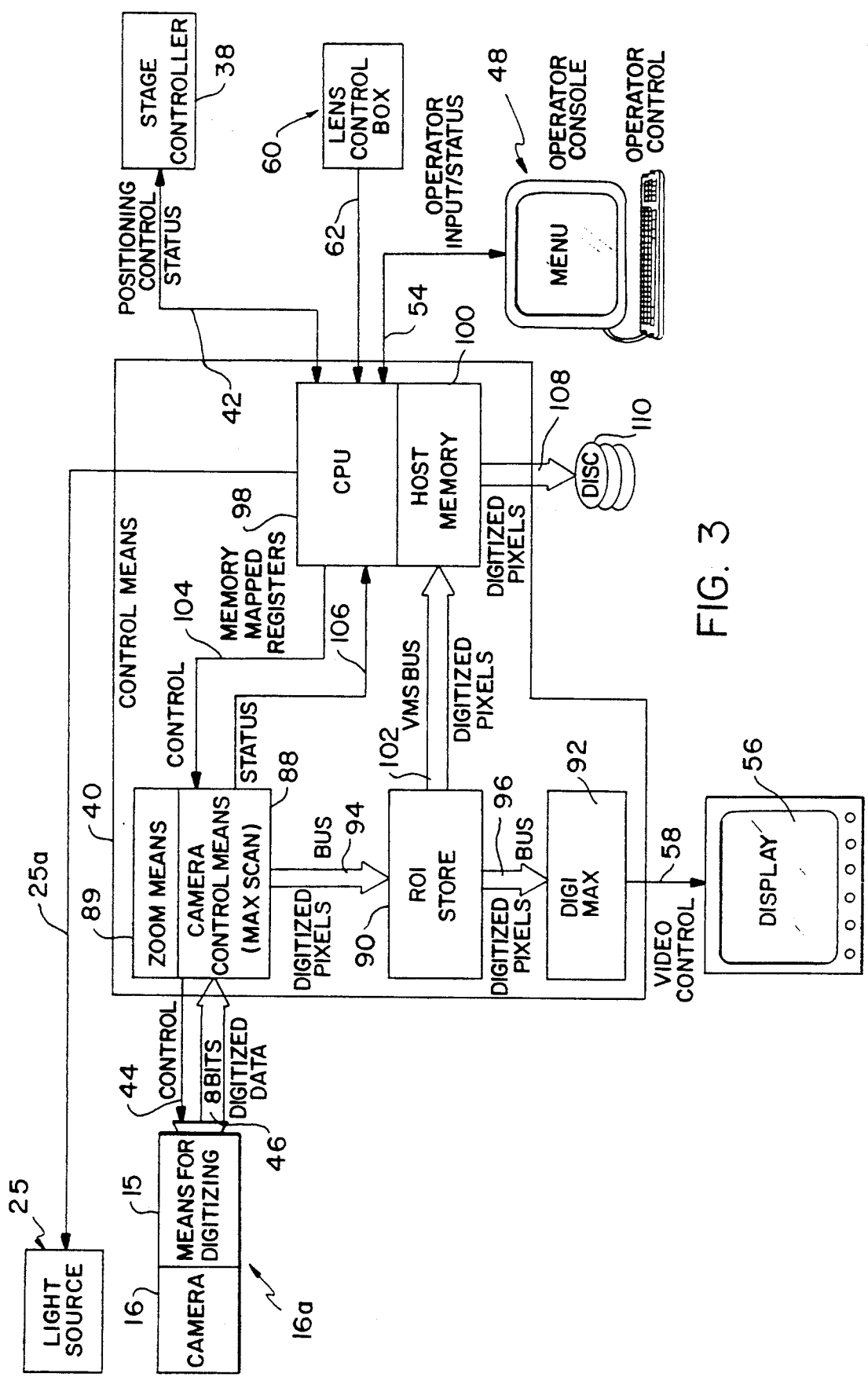
FIG. 3 is a block diagram arrangement showing the control system of the digitizer of the present invention.

Turning now to FIG. 3, the control means 40 will be discussed in more detail. This control means 40 includes a camera control means 88. This camera control means 88 comprises a MaxScan board. This camera control means controls the camera and gathers eight-bit digitized data from the digitizing means 15. The digitizing means 15 is located within the camera housing 16a. Lines 44 and 46 connect the camera control means 88 with the camera housing 16a.

The camera control means 88 is connected to a ROIStore board 90 through a first bus 94. The digitized data gathered in the camera control means 88 is transferred to this board 90 through the first bus 94. This board 90 can hold up to one-half megabytes of data and will store this data until a next acquisition process overwrites it.

Connected to board 90 is a DigiMax board 92. A second bus 96 connects boards 90 and 92. The display 56 is connected to board 92 through line 58. This board 92 enables display of data residing in the ROIStore board on the display 56. This display may be an RS-170 compatible SONY model PVM-122 black and white, high resolution monitor or any other acceptable display means. The interaction between boards 88, 90 and 92 is over a private MaxBus and is automatic upon image acquisition.

Upon receiving commands, the camera control means 88 sets the camera to expose the image. Such control commands travel over line 104 from the CPU 98 of the control means 40. Status information and other data can travel over line 106 from the camera control means 88 to the CPU 98.

Digitized pixels are placed in the ROIStore board 90 from the camera control means 88 and can simultaneously be shown on display 56 by the DigiMax board 92. The data in the ROIStore board 90 can be transferred to the host memory 100 through a VME bus 102. Any VME based system can be used. The data is stored in the host memory 100 in an available four megabytes of RAM and can be optionally written to disk 110 for long term storage. This disk 110 is connected to the host memory 100 through a digitized pixel bus 108. Other information besides digitized panels can be transferred to the disk 110. Besides disk 110, other forms of memory can be used.

Other hardware connections to the CPU 98 include the stage controller 38 which is connected via line 42. Further, the operator interface 48 is connected to the CPU 98 over line 54. The light source 25 is also connected to the CPU 98 over line 25a. This light source 25 comprises fiber optic bundle which will be discussed in more detail below.

Figure 4:
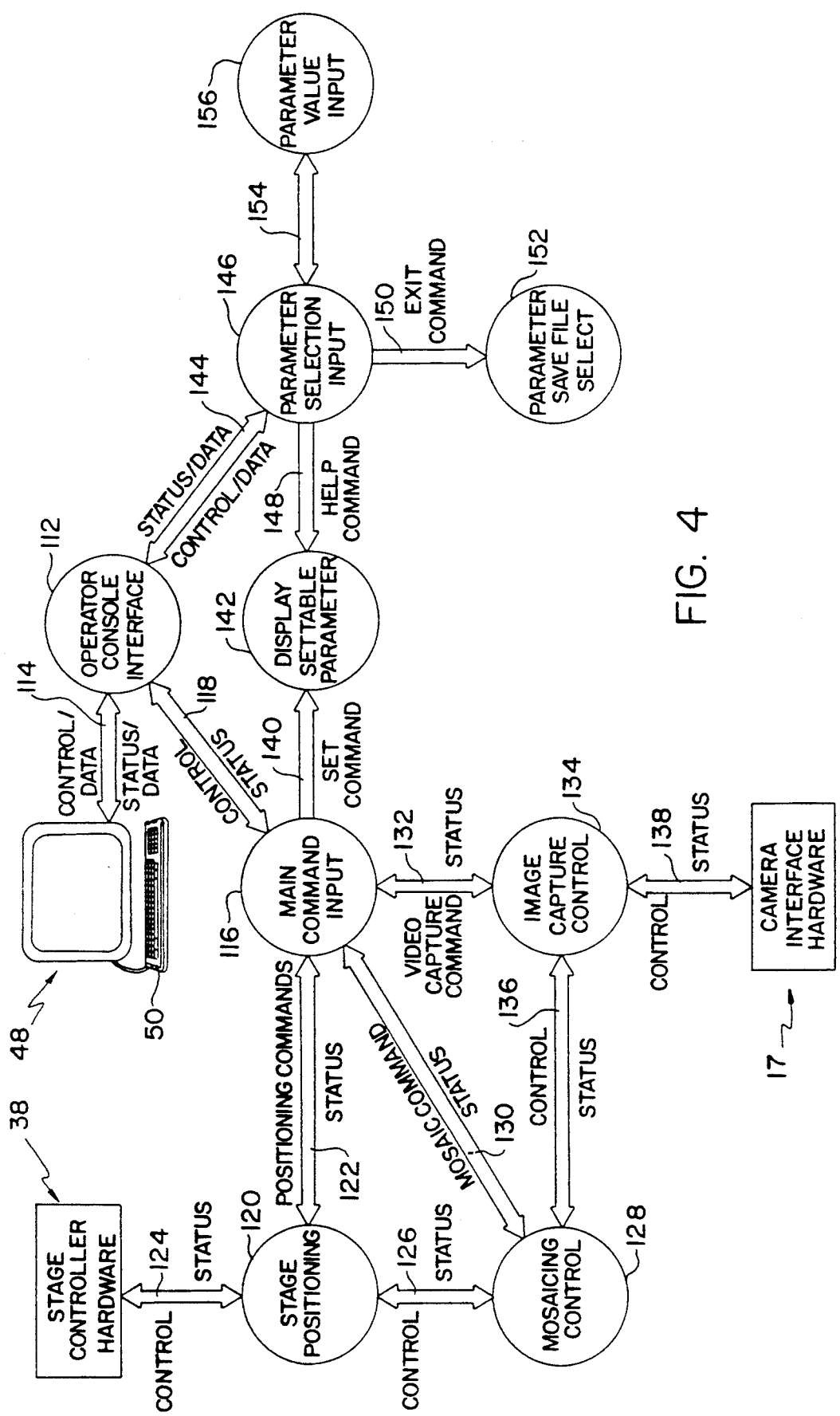
FIG. 4 is a digitized software control, data flow block diagram of the digitizer of the present invention.

Turning now to FIG. 4, the digitizer software control/data flow block diagram will now be explained. This diagram includes the operator interface 48, stage controller 38 as well as a camera interface hardware 17 mounted in the camera housing 16a. It should be noted that the software to control the digitizer of the instant invention is written in C language residing on a Unix (System V, release 3.26) based operating system, for example. The interface to the hardware is through memory mapped registers on the camera control means 88 and boards 90 and 92. The operational procedures are available to an operator from a menu driven interface and include camera control, stage control and image acquisition.

The main menu of the software contains various stage control operations. The stage may be initialized and sent to a hardware home position through the operator interface 48. Also, the operator may reposition the home position to a "soft home" X,Y coordinate location. This position may be changed in any direction by using the arrow keys of the keyboard 50 at a rate specified as step size by the operator.

As indicated by connection 114, control data information and status data information may be exchanged between the operator interface 48 and an operator console interface 112.

Various system parameters which can be reported or modified by the operator include the coordinates for the software-home position, conversion factors for both the X and Y planes, step size of the stage in the X and Y directions as well as range limits for both the X and Y directions. Moreover, a cursor location, angle of rotation of the camera 16 with respect to the stage axis and delay after the stage 26 is moved can be set by the operator through camera control means 88. This delay will allow for settling of the stage 26. Moreover, the operator can select the exposure time or operation in a manual mode. After any of these parameters are changed, the hardware is reinitialized and an image is digitized.

The image acquisition is obtained using several different methods. The operator may simply "view" the image, which consists of digitizing the image on a stage in a 512×512 pixel image area, storing it on a ROIStore board 90 and displaying it on display 56. The operator may also "snap" an image, which acquires a 1320×1045 image and copy it from the ROIStore board 90 into the host computer's RAM memory 100. This allows the operator to write the image to hard disk for archiving or for performing subsequent processing.

A mosaic operation, which allows the operator to select a center point on the image 158 and have a user specifiable number of tiles of the image 158 around the selected part digitized can also be performed. This method allows the various tiles to be pieced together in a seamless, non-overlapped image of a desired size. This mosaicing process is seen in FIG. 5c, for example. Various patches 160 of the image 158 can be combined to form this mosaic pattern.

Figure 5A:
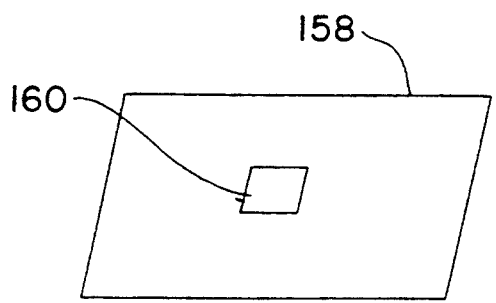
FIG. 5a is a diagram indicating single patch viewing of an image.
Figure 5B:
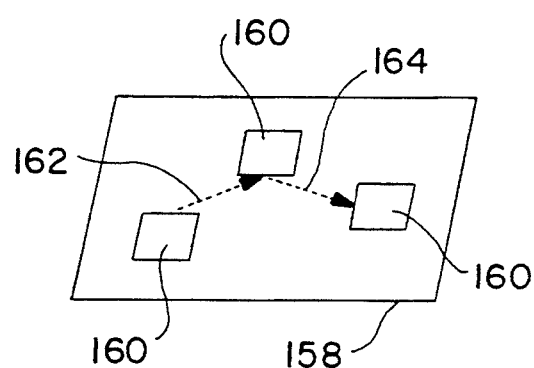
FIG. 5b is a diagram indicating successive viewing of non-adjacent patches of the image.
Figure 5C:
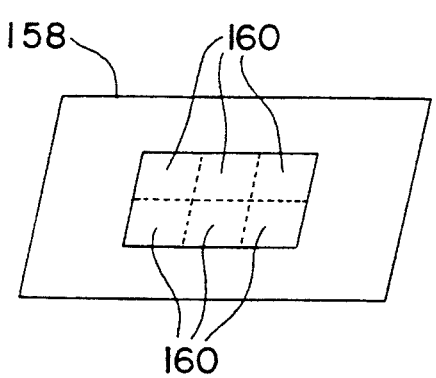
FIG. 5c is a diagram indicating seamless mosaic viewing of the image.
Figure 5D:
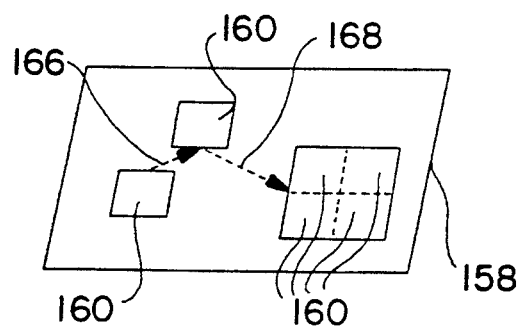
FIG. 5d is a diagram indicating mixed viewing of an image with the digitizer of the present invention.

As further indicated in FIG. 5d, a mixed viewing arrangement can be carried out by the operator. In particular, a sequence of patches 160 will be viewed as indicated by arrows 166 and 168 as well as a final mosaic pattern.

As additionally seen in FIG. 5a, a single patch 160 may be viewed or, as indicated in FIG. 5b, a sequence of patches 160 may be viewed as shown by arrows 162 and 164. Accordingly, the digitizer 10 is very flexible and can be easily controlled to follow irregular features. For instance, if a river on a map were to be digitized, the digitizer 10 could easily follow the irregular contours of the river and quickly digitize this image. Areas on the map which were not of concern need not be digitized. Therefore, unnecessary data acquisition is avoided and disk storage requirements can be minimized. Overall speed of the digitizer can also be increased.

The software of the present digitizer 10 operates in a loop around the main menu option as described above. The hardware will collectively report status with the exception of the stage, which returns a movement complete signal.

The operator console interface 112 seen in FIG. 4 is connected via line 118 to a main command input 116. Control information and status information will be sent over this line 118. A connection 122 extends from the main command input 116 to a stage positioning control 120. Positioning command and status information can travel over this line 122. From the stage positioning control 120, the stage controller hardware 38 can be accessed over line 124. Control and status information will travel over this line 124.

Also connected to the stage positioning control 120 is a mosaicing control arrangement 128. Line 126 connects stage positioning control 120 with the mosaicing control 128 whereby exchange of control and status information can be carried out. The main command input 116 is also connected to the mosaicing control 128 over line 130 through which mosaic commands and status information pass.

This mosaicing control 128 is finally connected to the image capture control 134 via line 136 which exchanges control and status information. The image capture control has two additional connections. One connection 132 is to the main command input 116 for exchange of video capture commands and status information while the second connection 138 is to the camera interface hardware 17 for exchange of control and status information.

The main command input 116 is further connected to a display settable parameter 142 via line 140. Set commands may be sent from the main command input 116 to the display settable parameter 142.

The operator console interface 112 is also connected to a parameter selection input 146 by line 144. Status data and control data may be exchanged over line 144. The display settable parameter 142 is connected to the parameter selection input 146 by line 148 which transmits help commands. The parameter selection input 146 is further connected to a parameter value input 156 and a parameter save file select 152 through lines 154 and 150, respectively.

This parameter selection input 146 will control the correction of misalignment of the camera. In particular, the camera may be skewed relative to the stage. While one viewing of a patch may not be affected by such skewing, if mosaicing of the patches were attempted, the control can accommodate for skewing of the pictures in order to maintain a seamless, nonoverlapping final image when the tiles are placed together.

Such a seamless mosaic was discussed with reference to FIG. 5c. Turning now to FIG. 5a, this Figure illustrates operation of the digitizer in the patch mode. The operator can select a reading of the image to be digitized and then select a resolution by varying the location of the lens 20. Each of the operations can be made in near-real time since only an average of 0.7 seconds is required between subsequent frames from the high resolution digitizing camera.

After completion of these selections, a single patch of imagery is stored (corresponding to 1320×1035 pixels). Resolution can be varied between 4 and 63 microns. Therefore, the size of a single patch in the film is roughly between 5 and 83 mm in size. For graphics applications (e.g. maps), magnification yielding pixel sizes of 50 through 250 microns and correspondingly larger patches may be used. The linear motors 30 and 32 can be obtained in sizes as large as 12 feet. Hence, large format graphics applications are realizable without changing stage technology.

In the patch-to-patch mode as seen in FIG. 5b, any number of patches can be digitized through repetition of the single patch mode. That is, the operator can select multiple patches under near-real time control. In fact, patches can be selected interactively in order to follow features of interest which do not lie in a regular pattern. As previously discussed, if a map were to be digitized, a river can be followed on this map to only digitize regions around the river. Alternatively, the positions of the various patches can be prestored and the stage automatically driven to the required locations such as in an automated inspection application.

The seamless mosaic mode shown in FIG. 5c illustrates digitizing a number of adjacent patches to thereby digitize large areas. As with previous modes, any combination of resolution and area is allowed unlike conventional digitizers' designs which restrict the resolution, area or both. In this mode, the entire film or a portion of it can be digitized at the resolution chosen by the operator. The digitizer positions adjacent patches to a small fraction of a pixel leading to seamless digitization of large areas. As before, since only 0.7 seconds are required between adjacent patches allowing for stage motion and camera read-out, film area can be digitized at a high rate of speed with an average data throughput of 1-2 megabytes/second (while even higher throughputs are available).

Combinations of the above patch and mosaic modes can be obtained as indicated in FIG. 5d. A single patch, multiple patches and mosaics may be digitized. The complete flexibility of the instant digitizer supports the digitization of any size or shape of area at any desired resolution.

By using the linear motors 30 and 32, a large item can be easily digitized as discussed above. Therefore, the instant application is applicable to microscopic as well as macroscopic items. An area to be digitized may be many feet and an accuracy may be had of up to one-half micron. Additionally, the use of linear motors 30 and 32 avoids the use of gears and/or lead screws as used in conventional digitizers. The speed of the stage 26 of the instant digitizer 10 can be easily varied. Unlike conventional arrangements, the instant digitizer does not use a lead screw and, therefore, the screw does not have to be changed in order to vary the speed of the stage. Also, no internal friction (as between gears) exists when using linear motors such that positioning of the stage may be carried outquickly. This feature is especially useful in vibrating, nonstationary environments such as a ship, trailer or other land vehicle, aircraft or spacecraft. Therefore, the system can respond to changes very quickly in the order of one-thousandths of a second. Therefore, the instant invention is not only rugged and compact but is suitable for use in nonstationary environments.

This digitizer 10 also provides for a high digitizing speed of up to 2,000,000 pixels per second. Because the linear motors 30 and 32 can precisely position the stage 26, mosaicing can be carried out without obtaining scanning artifacts. Real-time previewing and searching can be carried out in a cost effective manner.

The camera 16 of the instant invention may be a two-dimensional charged coupled device detector array. The stare-stepping design of this digitizer enables an operator to either digitize an entire image or a portion as required. In fact, the digitizer may be controlled via a joy-stick or software controlled to follow irregular features as previously noted. This results in reduced scan times and reduced data storage.

As noted above, a fiber optic bundle can be used as the light source 25. Use of a bundle of optical fibers will permit a patch 160 of the image 158 to be illuminated. Provision of the optical fiber bundle enables a constant source of illumination to be provided to the image. This patch illumination leads to flat fielding or the creation of a "level playing field".

In particular, the patch illumination is maintained in a stationary position and only the area to be digitized is illuminated. This has the advantage of all available light being placed into a small area whereby the camera may be more sensitive and can therefore work faster. Use of a fiber optic bundle leading the light from the source to the area of illumination can provide a constant light source. The light will be directed at a generally right angle to the image and diffusion will be avoided. This patch illumination can also result in an energy savings while overall efficiency can be improved. For transmissive scanning, the fiber optic light source 25 is located beneath the film plane. For reflective scanning, fiber optic light source 25 is located above the film plane.

By using patch illumination, a third benefit can be obtained. In particular, adaptive dynamic range can be had. In an image to be digitized, such as X-rays, very dark regions may be provided. It is therefore necessary to increase the light or the exposure time in this area so that the camera can better digitize the area. Thus, the level of illumination and/or the exposure time of the camera 16 can be controlled. The adaptive dynamic range uses two closed loop systems (positional control and exposure control). While differences in intensity of 1000:1 can be had with typical detectors, the instant digitizer can have a range of 100,000:1. Thus, the dynamic range is increased and more data may be made available. Better gray scale resolution can also be had with the instant digitizer 10. By adapting the pixel depth (dynamic range) to the local image density on a patch-by-patch basis, improved overall image digitization and contrast sensitivity can be had.

By utilizing patch illumination, small memory requirements are obtained. In particular, each sensor for a pixel may be slightly different. Alternatively, light from the source may vary in different areas of patch 160. By only exposing a limited area of the imaged light, such variations are reduced. The instant digitizer 10 can therefore calibrate for differences due to each pixel and differences due to the variations in light are corrected for such differences. In a non-patch illuminator, this arrangement would require storage of two correction numbers. There may therefore be hundreds of millions of numbers to store in a non-patch illuminator but with patch illumination, there is only the need to store one million numbers. Thus, a memory savings as well as an increase in speed results.

The instant digitizer 10 therefore provides for an arrangement which can easily and accurately digitize an image. The entire image, adjacent portions of the image or non-adjacent portions of the image may be easily digitized. This digitizer is both rugged and compact and can be used in a non-stationary environment. As discussed above, other advantages can be obtained with this instant digitizer.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A digitizer comprising:
a camera provided in a camera housing;
a movable stage for holding an image to be viewed by the camera;
a first linear motor for moving the stage in a first direction;
a second linear motor for moving the stage in a second direction, said first and second linear motors being gearless and screwless in moving the stage;
control means, operatively connected to the camera and the first and second linear motors, said control means controlling the camera and positioning of the stage relative to the camera;
means for digitizing the image viewed by the camera;
stage controller means operatively connected to said first and second linear motors and said control means for controlling movement of the stage in the first and second directions by the first and second linear motors; and
input means connected to the control means for enabling an operator to selectively control positioning of the stage, said input means enabling an operator to select coordinates for a home position of said image, an amount of movement of the stage relative to the camera, and a time delay after movement of the stage before the digitizing means will process the image.

2. The digitizer as recited in claim 1, wherein the image to be digitized is macroscopic and wherein the stage is movable over a distance of several feet to enable the camera to scan the image.

3. The digitizer as recited in claim 1, wherein the control means comprises camera control means for controlling an angle of the camera relative to the stage and exposure time of the camera and wherein the input means further enables the operator to selectively control the camera control means.

4. The digitizer as recited in claim 3, wherein the means for digitizing is located within the camera housing and wherein the camera control means comprises a first board which controls the camera and gathers digitized data from the digitizing means, the control means further comprises a second board, a third board and memory means, the second board being operatively connected to the first board for receiving the digitized data therefrom and temporarily holding the digitized data, said memory means being operatively connected to the second board for receiving selected digitizer data therefrom and for storing said selected digitized data and said digitizer further comprising means for displaying the image viewed by the camera, said display means being operatively connected to the third board.

5. A digitizer comprising:
a camera provided in a camera housing;
a movable stage for holding an image to be viewed by the camera;
a first linear motor for moving the stage in a first direction;
a second linear motor for moving the stage in a second direction, said first and second linear motors being gearless and screwless in moving the stage;
control means, operatively connected to the camera and the first and second linear motors, said control means controlling the camera and positioning of the stage relative to the camera, the control means comprises camera control means for controlling an angle of the camera relative to the stage and exposure time of the camera; and
means for digitizing the image viewed by the camera, the means for digitizing being located within the camera housing and wherein the camera control means comprises a first board which controls the camera and gathers digitized data from the digitizing means, the control means further comprises a second board, a third board and memory means, said second board being operatively connected to the first board for receiving the digitized data therefrom and temporarily holding the digitized data, said memory means being operatively connected to the second board for receiving selected digitized data therefrom and for storing said selected digitized data and said digitizer further comprising means for displaying the image viewed by the camera, said display means being operatively connected to the third board.

6. The digitizer as recited in claim 1, wherein the means for digitizing is located within the camera housing, said camera housing and said control means being connected by a first and second line, said first line transmitting camera control instructions from said control means to the camera and said second line transmitting digitized data from the digitizing means to the control means.

7. The digitizer as recited in claim 6, wherein the camera is a charged coupled deice.

8. The digitizer as recited in claim 1, wherein the camera is a charged coupled device.

9. The digitizer as recited in claim 1, wherein the first linear motor is generally perpendicular to the second linear motor and the stage is located above both the first and second motors.

10. The digitizer as recited in claim 9, further comprising a light source provided adjacent the camera housing for illuminating a patch of the image, said light source providing substantially constant illumination to the image.

11. The digitizer as recited in claim 10, wherein the light source comprises a bundle of optical fibers.

12. The digitizer as recited in claim 11, wherein the digitizing means has at least one sensor for each pixel of the image viewed by the camera and wherein the control means further calibrates for differences between each pixel and for differences in illumination of the image and thereafter compensates for the difference.

13. The digitizer as recited in claim 11, wherein the control means further controls a level of illumination from the light source and an amount of exposure time of the image of the digitizing means to thereby provide for adaptive dynamic range.

14. The digitizer as recited in claim 1, further comprising a light source provided adjacent the camera housing for illuminating patch of the image, said light source providing substantially constant illumination to the image.

15. The digitizer as recited in claim 14, wherein the light source comprises a bundle of optical fibers.

16. The digitizer as recited in claim 15, wherein the digitizing means has at least one sensor for each pixel of the image viewed by the camera and wherein the control means further calibrates for differences between each pixels and for differences in illumination of the image and thereafter compensates for the differences.

17. The digitizer as recited in claim 15, wherein the control means further controls a level of illumination from the light source and an amount of exposure time of the image to the digitizing means to thereby provide for adaptive dynamic range.

18. The digitizer as recited in claim 1, further comprising:
a closed loop control mechanism with feedback at a frequency of 1000 times per second which senses vibration and provides accurate and repeatable stage positioning.

19. The digitizer as recited in claim 1, further comprising:
means for correcting misalignment between an axis of motion of the stage and a camera axis, which consists of a two-dimensional stage movement ($\Delta x$ and $\Delta y$) in positioning to a next contiguous patch in a collection sequence.

20. The digitizer as recited in claim 1, further comprising:
means for computing and correcting effects of keystoning caused by non-orthogonality of imaging rays and the stage containing a hardcopy media to be digitized.

21. A digitizer comprising:
a camera provided in a camera housing;
a movable stage for holding an image to be viewed by the camera;
means for moving the stage;
control means operatively connected to the camera and the means for moving, said control means controlling the camera and positioning the stage relative to the camera, the control means controlling an angle of the camera relative to the stage and exposure time of the camera;
means for digitizing the image viewed by the camera;
means for illuminating a patch of the image to be viewed by the camera, said means for illuminating providing a substantially constant illumination to the image and said means for illuminating comprising a bundle of optical fibers;
wherein the means for moving the stage comprises a first linear motor for moving the stage in a first direction and a second linear motor for moving the stage in a second direction, said first and second linear motors being gearless and screwless in moving the stage;
stage controller means operatively connected to said first and second linear motors and said control means for controlling movement of the stage in the first and second directions by the first and second linear motors; and
input means connected to the control means for enabling an operator to selectively control positioning of the stage, said input means enabling an operator to select coordinates for a home position of said image, an amount of movement of the stage relative to the camera, a maximum amount of movement of the stage relative to the camera, and a time delay after movement of the stage before the digitizing means will process the image.

22. The digitizer as recited in claim 21, wherein the digitizing means has at least one sensor for each pixel of the image viewed by the camera and wherein the control means further calibrates for differences between each pixel and for differences in illumination of the image and thereafter compensates for the differences.

23. The digitizer as recited in claim 22, wherein the control means further controls a level of illumination from the light source and an amount of exposure time of the image to the digitizing means to thereby provide for adaptive dynamic range.

24. The digitizer as recited in claim 21, wherein the first linear motor is generally perpendicular to the second liner motor and the stage is located above both the first and second linear motors.

25. The digitizer as recited in claim 21, wherein the image to be digitized is macroscopic and wherein the stage is movable over a distance of several feet to enable the camera to scan the image.

26. The digitizer as recited in claim 21, wherein the control means comprises camera control means for controlling an angle of the camera relative to the stage and exposure time of the camera and wherein the input means further enables the operator to selectively control the camera control means.

27. The digitizer as recited in claim 26, herein the means for digitizing is located within the camera housing and wherein the camera control means comprises a first board which controls the camera and gathers digitized data from the digitizing means, the control means further comprises a second board, a third board and memory means, the second board being operatively connected to the first board for receiving the digitized data therefrom and temporarily holding the digitized data, said memory means being operatively connected to the second board for receiving selected digitized data therefrom and for storing said selected digitized data and said digitizer further comprising means for displaying the image viewed by the camera, said display means being operatively connected to the third board.

28. The digitizer as recited in claim 21, wherein the means for digitizing is located within the camera housing and wherein the camera control means comprises a first board which controls the camera and gathers digitized data from the digitizing means, the control means further comprises a second board, a third board and memory means, said second board being operatively connected to the first board for receiving the digitized data therefrom and temporarily holding the digitized data, said memory means being operatively connected to the second board for receiving selected digitized data therefrom and for storing said selected digitized data and said digitizer further comprising means for displaying the image viewed by the camera, said display means being operatively connected to the third board.

29. The digitizer as recited in claim 21, wherein the means for digitizing is located within the camera housing, said camera housing and said control means being connected by a first and second line, said first line transmitting camera control instruction from said control means to the camera and said second line transmitting digitized data from the digitizing means to the control means.

30. The digitizer as recited in claim 21, wherein the camera is a charged coupled device.

* * * * *